United States Patent

Hosaka et al.

[11] Patent Number: 5,932,510
[45] Date of Patent: Aug. 3, 1999

[54] SOLID CATALYST COMPONENT AND CATALYST FOR POLYMERIZATION OF OLEFINS

[75] Inventors: Motoki Hosaka; Kenji Goto; Takuo Kataoka; Hayashi Ogawa, all of Kangawa, Japan

[73] Assignee: Toho Titanium Co., Ltd., Chigasaki, Japan

[21] Appl. No.: 08/817,700

[22] PCT Filed: Aug. 21, 1996

[86] PCT No.: PCT/JP96/02337

§ 371 Date: May 1, 1997

§ 102(e) Date: May 1, 1997

[87] PCT Pub. No.: WO97/09355

PCT Pub. Date: Mar. 13, 1997

[30] Foreign Application Priority Data

Sep. 1, 1995 [JP] Japan ............ 7-2483898
Sep. 18, 1995 [JP] Japan ............ 7-263507

[51] Int. Cl.[6] ............ B01J 31/00; B01J 37/00; C08F 4/02; C08F 4/60
[52] U.S. Cl. ............ 502/127; 502/125; 502/116; 502/132; 502/114; 502/133; 526/124.9; 526/128
[58] Field of Search ............ 502/110, 114, 502/115, 116, 125, 127, 132, 133

[56] References Cited

U.S. PATENT DOCUMENTS

| | | | |
|---|---|---|---|
| 3,987,233 | 10/1976 | Sato et al. ............ | 502/133 |
| 4,451,688 | 5/1984 | Kuroda et al. ............ | 502/133 |
| 4,497,906 | 2/1985 | Hanji et al. ............ | 502/116 |
| 4,547,476 | 10/1985 | Terano et al. ............ | 502/127 |
| 4,816,433 | 3/1989 | Terano et al. ............ | 502/125 |
| 5,300,470 | 4/1994 | Cuffiani et al. ............ | 502/133 |
| 5,300,597 | 4/1994 | Miro ............ | 502/133 |
| 5,547,912 | 8/1996 | Kataoka et al. ............ | 502/116 |
| 5,608,018 | 3/1997 | Ebara et al. ............ | 502/116 |
| 5,773,537 | 6/1998 | Mueller ............ | 502/127 |

FOREIGN PATENT DOCUMENTS

| | | |
|---|---|---|
| 0 665 243 | 8/1995 | European Pat. Off. . |
| 2 350 196 | 4/1974 | Germany ............ 502/116 |
| 62-158704 | 7/1987 | Japan . |
| 63-301 | 1/1988 | Japan . |
| 1-149807 | 6/1989 | Japan . |
| 8-67711 | 3/1996 | Japan . |

*Primary Examiner*—Mark L. Bell
*Assistant Examiner*—J. Pastercyzk
*Attorney, Agent, or Firm*—Oblon, Spivak, McClelland, Maier & Neustadt, P.C.

[57] ABSTRACT

The present invention provides a solid catalyst component (A) obtained by allowing a dialkoxymagnesium or diaryloxymagnesium, a titanium compound, a diester of phthalic acid and a cyclic or chain polysiloxane to come in contact with one another.

Further, the present invention provides a catalyst for polymerization of olefins prepared from the foregoing solid catalyst component (A), an organic aluminum compound and an organic silicon compound.

4 Claims, 2 Drawing Sheets

*FIG. 2*

SOLID CATALYST COMPONENT AND CATALYST FOR POLYMERIZATION OF OLEFINS

TECHNICAL FIELD

The present invention relates to a solid catalyst component and catalyst for polymerization of olefins which can provide a polymer having a high stereoregularity, excellent particle properties, in particular a high bulk density, and a small content of fine powder in a high yield.

More particularly, the present invention relates to a solid catalyst component and catalyst for polymerization of olefins which can provide a copolymer having excellent particle properties in a high yield even if the production ratio of rubber-like polymer is raised in the block copolymerization of olefins.

TECHNICAL BACKGROUND

Many proposals have been made and known for a solid catalyst component comprising a titanium halide compound, a magnesium compound and an electron donor compound as essential components and a process for the polymerization of olefins in the presence of a catalyst comprising said solid catalyst component, an organic aluminum compound and a third component such as a silicon compound.

Further, a solid catalyst component prepared from a dialkoxymagnesium and titanium tetrachloride as main starting materials and a catalyst for polymerization of olefins made of said solid catalyst component, an organic aluminum compound and a third component such as a silicon compound have been known as disclosed in JP-A-63-3010 (The term "JP-A" as used herein means an "unexamined published Japanese patent application"), JP-A-1-221405, JP-A-1-315406, JP-A-3-227309, JP-A-3-70711, JP-A-4-8709, and many other references.

The foregoing various techniques focus on the development of a catalyst component which is active enough to allow the omission of a so-called deashing step, i.e., step of removing catalyst residues such as chlorine and titanium remaining in the polymer produced by the polymerization of propylene in the presence of a catalyst as well as on the enhancement of the yield of stereoregular polymer. These techniques can provide excellent results on these purposes.

However, if a polymerization catalyst having a composition comprising this kind of a high activity type catalyst component, an organic aluminum compound and an electron donor compound such as silicon compound is employed to polymerize olefins, the polymer thus produced contains much fine powder derived from fine solid catalyst component itself or obtained by fragmentation due to reaction heat during polymerization. Thus, the polymer has a broad particle size distribution. As a result, the bulk density of the polymer thus produced tends to drop. If the content of the fine polymer is raised, the continuance of uniform reaction can be inhibited. Further, the pipe in the polymerization process can be blocked. Moreover, some troubles can occur at the separation step and the drying step of the polymer thus produced. It has been desired to solve these problems. In addition, if the particle size distribution is widened, it eventually gives undesirable effects on the formation of the polymer. If the bulk density of the polymer thus produced is lowered, the resulting productivity is extremely lowered. This is the reason why a polymer having as small fine polymer content as possible and a high bulk density has been desired.

In order to solve these problems, many methods have been proposed and are known for polymerizing olefins in the presence of a solid catalyst component comprising as essential components a magnesium compound such as dihalogenated magnesium and alkylmagnesium compounds, a titanium compound, an electron donor compound and a polysiloxane or a catalyst comprising said solid catalyst component, an organic aluminum compound and a third component such as a silicon compound. For example, JP-A-61-204202 discloses a catalyst component for polymerization of olefins prepared by allowing the reaction product of dihalogenated magnesium, titanium tetraalkoxide and hydrogenated polysiloxane, an acid halide compound and a silicon halide compound to come in contact with one another. Further, JP-A56-152811 discloses a process for the production of a polyolefin which comprises the polymerization of olefins in the presence of a catalyst comprising in combination a titanium-containing solid catalyst component derived from an alkylmagnesium compound, a polysiloxane, an organic acid ester and a titanium compound and an organic metal compound.

On the other hand, JP-A-6-157659 proposes a catalyst for polymerization of olefins made of a solid catalyst component obtained by a process which comprises adding a suspension of a spherical particulate dialkoxymagnesium, an aromatic hydrocarbon and a diester of phthalic acid to a mixed solution of an aromatic hydrocarbon and titanium tetrachloride so that they are reacted, and then reacting the reaction product with titanium tetrachloride.

Further, JP-A-6-287225 proposes a solid catalyst component for polymerization of olefins obtained by a process which comprises adding a suspension of a spherical particulate dialkoxymagnesium, an aromatic hydrocarbon and a diester of phthalic acid to a mixed solution of an aromatic hydrocarbon and titanium tetrachloride so that they are reacted, washing the reaction product with an aromatic hydrocarbon, and then again reacting the reaction product with titanium tetrachloride to obtain a solid component which is then dried and freed of fine powder.

Further, JP-A-6-287217 proposes a solid catalyst component for polymerization of olefins obtained by a process which comprises adding a suspension of a spherical particulate dialkoxymagnesium, an aromatic hydrocarbon and a diester of phthalic acid to a mixed solution of an aromatic hydrocarbon and titanium tetrachloride-so that they are reacted, washing the reaction product with an aromatic hydrocarbon, again reacting the reaction product with titanium tetrachloride, drying the solid component thus obtained, removing fine powder from the solid component, and then adding a powdered nonionic surface active agent to the solid component.

The foregoing technique can remove the fine powder derived from the solid catalyst component itself, eventually exerting an effect of reducing the content of fine powder in the polymer thus produced. However, the effect of the foregoing technique does not go so far as to control the generation of fine powder due to fragmentation of particles by the reaction heat during polymerization, in particular in the initial stage of the polymerization reaction. Thus, a fine powder is still present in the polymer thus produced.

Further, the polymer produced according to the foregoing technique has a good morphology but has a low bulk density. In the production of a polyolefin, the amount of a polymer to be produced per unit volume in the polymerization tank is reduced, and the amount of the polymer to be processed during transportation or pelletizing step is limited. As a result, such a problem that the productivity throughout the entire process for the production of polyolefin is reduced is left unsolved. Further, even if a polymer having a relatively high bulk density can be obtained, the problem of drop of polymerization activity or stereoregularity is left unsolved.

From the standpoint of energy saving or conservation of resources related to the recent global environmental issue, it has been keenly desired to reduce the weight of plastics for use in automobile, household appliance, etc. In order to solve this problem, the thickness of molded plastic articles needs to be reduced while maintaining its strength such as impact strength. To this end, it is desired to further enhance the stereoregularity or crystallinity and hence the rigidity of the resin to be used. Accordingly, it has been desired to develop a catalyst for the production of a polyolefin which can provide a polymer having an enhanced stereoregularity or crystallinity.

On the other hand, a process for the production of a block copolymer of propylene has been known which comprises producing a crystalline polymer of propylene alone in the presence of a solid catalyst component or catalyst of the various conventional types at a first stage, and then copolymerizing propylene with another olefin such as ethylene and 1-butene in the copresence of said propylene homopolymer at a second stage.

Such a block copolymer contains a rubber-like copolymer in a certain proportion and thus exhibits an enhanced impact strength while maintaining an excellent rigidity characteristic of crystalline polypropylene. Therefore, such a block copolymer has found wide application, e.g., to container, automobile parts such as bumper and film requiring low temperature heat sealability.

In order to further enhance the impact strength of such a block copolymer, the proportion of a rubber-like copolymer (e.g., ethylene-propylene rubber) to be produced in the block copolymer needs to be raised. However, as the production ratio of rubber-like copolymer increases, the adhesion of the particulate block copolymer thus produced increases. As a result, the flowability of the particulate polymer thus produced shows a remarkable deterioration in the gas phase polymerization process or bulk polymerization process. Further, the polymer particles stick to each other to agglomerate or stick to the inner wall of the polymerization apparatus, causing serious troubles in the process operation.

For the purpose of eliminating the deterioration of the flowability of the particulate block copolymer or the adhesion of the particles causing agglomeration or the adhesion of the particles to the inner wall of the apparatus, JP-A-61-69821 and JP-A-61-69822 propose the supply of an active hydrogen compound such as ethanol or an oxygen-containing compound such as oxygen gas into the polymerization system at the second stage, i.e., stage of producing a rubber-like copolymer. However, such an active hydrogen compound or oxygen-containing compound originally causes deterioration of the activity of the catalyst in the polymerization of olefins. In this process, the amount of such an active hydrogen compound or oxygen-containing compound to be supplied needs to be closely controlled. Further, the apparatus to be used for this process needs to be improved.

The present invention is intended to solve the foregoing problems of the prior art techniques. In other words, an object of the present invention is to provide a solid catalyst component and catalyst for polymerization of olefins which can provide a polymer having a high bulk density and a small content of fine powder while maintaining the desired high polymerization activity and high yield of a high stereoregularity polymer. Another object of the present invention is to provide a solid catalyst component and catalyst for polymerization of olefins which can maintain its good particle properties even if the production ratio of rubber-like copolymer is raised in block copolymerization.

DISCLOSURE OF THE INVENTION

The solid catalyst component (hereinafter occasionally referred to as "solid catalyst component (A)") for polymerization of olefins of the present invention for accomplishing the foregoing objects is characterized in that it is prepared from the following components (a) to (d):

(a) a dialkoxymagnesium or diaryloxymagnesium represented by the general formula:

$$Mg(OR^1)_2$$

wherein $R^1$ represents a $C_{1-4}$ alkyl or aryl group;

(b) a titanium compound represented by the general formula:

$$Ti(OR^2)_pX_{4-p}$$

wherein $R^2$ represents a $C_{1-4}$ alkyl group; X represents a halogen atom; and p represents 0 or an integer of from 1 to 3;

(c) a diester of aromatic dicarboxylic acid; and (d) a cyclic or chain polysiloxane.

The catalyst for polymerization of olefins of the present invention is also characterized in that it comprises the foregoing solid catalyst component (A), and the following components (B) and (C):

(B) an organic aluminum compound represented by the general formula:

$$R^3{}_qAlQ_{3-q}$$

wherein $R^3$ represents a $C_{1-4}$ alkyl group; Y represents a hydrogen, chlorine, bromine or iodine atom; and q represents a real number of from more than 0 to not more than 3; and (C) an organic silicon compound represented by the general formula:

$$R^4{}_rSi(OR^5)_{4-r}$$

wherein $R^4$ represents the same or different alkyl, cycloalkyl, phenyl, vinyl, allyl or aralkyl group; $R^5$ represents the same or different $C_{1-4}$ alkyl, cycloalkyl, phenyl, vinyl, allyl or aralkyl group; and r represents 0 or an integer of from 1 to 3.

BEST EMBODIMENT FOR IMPLEMENTING THE INVENTION

Preferred examples of the dialkoxymagnesium or diaryloxymagnesium represented by the general formula: $Mg(OR^1)_2$ (wherein $R^1$ represents a $C_{1-4}$ alkyl or aryl group) as component (a) (hereinafter occasionally referred to as "component (a)") constituting the solid catalyst component (A) of the present invention (hereinafter occasionally referred to as "component (A)") include dimethoxymagnesium, diethoxymagnesium, di-n-propoxymagnesium, di-iso-propoxymagnesium, di-n-butoxymagnesium, di-iso-butoxymagnesium, diphenoxymagnesium, ethoxymethoxymagnesium, ethoxy-n-propoxymagnesium, n-butoxyethoxymagnesium, and iso-butoxyethoxymagnesium. These dialkoxymagnesiums or diaryloxymagnesiums may be used singly or in combination of two or more of them. Particularly preferred among these dialkoxymagnesiums or diaryloxymagnesiums is diethoxymagnesium or di-n-propoxymagnesium.

Further, the dialkoxymagnesium or diaryloxymagnesium may be used in granular or powder form to prepare the solid catalyst component (A) in the present invention. The particle shape of the dialkoxymagnesium or diaryloxymagnesium may be amorphous or spherical. If a spherical particulate dialkoxymagnesium or diaryloxymagnesium is used, a polymer powder having a better particle shape and a narrower particle size distribution can be obtained. Thus, the polymer powder produced can be better handled during the polymerization, eliminating troubles such as blocking caused by the fine powder contained in the polymer powder produced.

The foregoing spherical particulate dialkoxymagnesium or diaryloxymagnesium does not necessarily need to be round but may be ellipsoidal or pebble-like. In some detail, the sphericity of the particle is not more than 3, preferably from 1 to 2, more preferably from 1 to 1.5 as calculated in terms of ratio of major axis length l to minor axis length w (l/w).

Further, the foregoing dialkoxymagnesium or diaryloxymagnesium may have an average particle diameter of from 1 $\mu$m to 200 $\mu$m, preferably from 5 $\mu$m to 150 $\mu$m. Further, the foregoing dialkoxymagnesium or diaryloxymagnesium has a specific surface area of from 5 to 50 m$^2$/g, preferably from 10 to 40 m$^2$/g, more preferably from 15 to 30 m$^2$/g.

The foregoing spherical particulate dialkoxymagnesium or diaryloxymagnesium has an average particle diameter of from 1 $\mu$m to 100 $\mu$m, preferably from 5 $\mu$m to 50 $\mu$m, more preferably from 10 $\mu$m to 40 $\mu$m. Further, referring to its particle size, the foregoing spherical particulate compound preferably has a sharp particle size distribution comprising less fine or coarse powder. In some detail, the particle size distribution comprises particles having a particle size of not more than 5 $\mu$m in an amount of not more than 20%, preferably not more than 10%, and particles having a particle size of at least 100 $\mu$m in an amount of not more than 10%, more preferably not more than 5%. The particle size distribution is not more than 3, preferably not more than 2, as calculated in terms of ln (D90/D10) (wherein D90 represents the particle diameter at the point where the accumulated particle size reaches 90% and D10 represents the particle diameter at the point where the accumulated particle size reaches 10%).

The spherical particulate dialkoxymagnesium or diaryloxymagnesium to be used normally has a bulk density of from 0.20 to 0.35 g/ml as determined according to JIS K6721. In general, if a solid catalyst component comprising a spherical particulate dialkoxymagnesium or diaryloxymagnesium having such a high bulk density is used to effect polymerization of olefins, a polymer having a higher bulk density can be obtained. In the present invention, even if the spherical particulate dialkoxymagnesium or diaryloxymagnesium used has a bulk density as relatively low as less than 0.25 g/ml, for example, the bulk density of the polymer produced in the presence of a solid catalyst component comprising such a spherical particulate dialkoxymagnesium or diaryloxymagnesium is not lowered. Thus, a polymer having a high bulk density can be obtained.

The component (b) to be used in the preparation of the solid catalyst component (A) of the present invention is a titanium compound (hereinafter occasionally referred to as "component (b)") represented by the general formula: Ti(OR$^2$)$_p$X$_{4-p}$ (wherein R$^2$ represents a C$_{1-4}$ alkyl group; X represents a halogen atom; and p represents 0 or an integer of from 1 to 3). Examples of such a titanium compound include titanium halide and alkoxytitanium halide. Specific examples of the titanium tetrahalide include TiCl$_4$, TiBr$_4$, and TiI$_4$. Specific examples of the alkoxytitanium halide include Ti(OCH$_3$)Cl$_3$, Ti(OC$_2$H$_5$)Cl$_3$, Ti(OC$_3$H$_7$)Cl$_3$, Ti(O—(n)C$_4$H$_9$)—Cl$_3$, Ti(OCH$_3$)$_2$Cl$_2$, Ti(OC$_2$H$_5$)$_2$Cl$_2$, Ti(OC$_3$H$_7$)$_2$Cl$_2$, Ti(O—(n)C$_4$H$_9$)$_2$Cl$_2$, Ti(OCH$_3$)$_3$Cl, Ti(OC$_2$H$_5$)$_3$Cl, Ti(OC$_3$H$_7$)$_3$Cl, and Ti(O—(n)C$_4$H$_9$)$_3$Cl. Preferred among these titanium compounds is titanium tetrahalide. Particularly preferred is TiCl$_4$. These titanium compounds may be used singly or in combination of two or more of them. The component (b) may be dissolved in and diluted with an organic solvent such as aromatic hydrocarbon (e.g., toluene, xylene) and aliphatic hydrocarbon (e.g., hexane, heptane) before use.

Particularly preferred as the diester of aromatic dicarboxylic acid as component (c) (hereinafter occasionally referred to as "component (c)") to be used for the preparation of the solid catalyst component (A) of the present invention is a C$_{1-12}$ straight-chain or branched alkyl diester of phthalic acid. Specific examples of such a diester include dimethyl phthalate, diethyl phthalate, di-n-propyl phthalate, di-iso-propyl phthalate, di-n-butyl phthalate, di-iso-butyl phthalate, ethyl methyl phthalate, butyl ethyl phthalate, methyl (iso-propyl) phthalate, ethyl (n-propyl) phthalate, ethyl (n-butyl) phthalate, di-n-pentyl phthalate, di-iso-pentyl phthalate, dihexyl phthalate, di-n-hepthyl phthalate, di-n-octyl phthalate, bis(2-methylhexyl) phthalate, bis(2-ethylhexyl) phthalate, di-n-nonyl phthalate, di-iso-decyl phthalate, bis(2,2-dimethylheptyl) phthalate, n-butyl (iso-hexyl) phthalate, ethyl (iso-octyl) phthalate, n-butyl (iso-octyl) phthalate, n-pentyl (n-hexyl) phthalate, n-pentyl (iso-hexyl) phthalate, iso-pentyl (n-heptyl) phthalate, n-pentyl (iso-octyl) phthalate, n-pentyl (iso-nonyl) phthalate, iso-pentyl (n-decyl) phthalate, n-pentyl (n-undecyl) phthalate, iso-pentyl (iso-hexyl) phthalate, n-hexyl (iso-octyl) phthalate, n-hexyl (iso-nonyl) phthalate, n-hexyl (n-decyl) phthalate, n-heptyl (iso-octyl) phthalate, n-heptyl (iso-nonyl) phthalate, n-heptyl (neo-decyl) phthalate, iso-octyl (iso-nonyl) phthalate, dicyclohexyl phthalate, and butylbenzyl phthalate. These phthalic acid esters may be used singly or in combination of two or more of them. Preferred among these phthalic acid esters are diethyl phthalate, di-n-butyl phthalate, di-iso-butyl phthalate, and bis(2-ethylhexyl) phthalate.

If two or more of these components (c) are used in combination, at least two diesters of aromatic dicarboxylic acid selected in such a manner that the difference in the sum of the number of carbon atoms in two alkyl groups in respective diesters of aromatic dicarboxylic acid is at least 4 may be used (hereinafter the diester of aromatic dicarboxylic acid having more carbon atoms in two alkyl groups than the other will be occasionally referred to as "component (c1)", and the other will be occasionally referred to as "component (c2)").

Preferably, two or more diesters of phthalic acid may be used. Their combination is preferably such that the difference between the sum of the number of carbon atoms contained in two alkyl groups in one diester of phthalic acid and the sum of the number of carbon atoms contained in two alkyl groups in another diester of phthalic acid is at least 4. Specific examples of such a combination will be given below.

|  | Component (c1) | Component (c2) |
| --- | --- | --- |
| 1) | Di-n-butyl phthalate | Diethyl phthalate |
| 2) | Di-iso-butyl phthalate | Diethyl phthalate |
| 3) | Bis(2-ethylhexyl) phthalate | Diethyl phthalate |
| 4) | Di-n-octyl phthalate | Diethyl phthalate |
| 5) | Di-iso-decyl phthalate | Diethyl phthalate |
| 6) | Butylbenzyl phthalate | Diethyl phthalate |
| 7) | Di-n-hexyl phthalate | Diethyl phthalate |
| 8) | Di-iso-hexyl phthalate | Diethyl phthalate, |
| 9) | Bis(2-ethylhexyl) phthalate | Di-n-propyl phthalate |
| 10) | Di-n-octyl phthalate | Di-n-propyl phthalate |
| 11) | Di-iso-decyl phthalate | Di-n-propyl phthalate |
| 12) | Butylbenzyl phthalate | Di-n-propyl phthalate |
| 13) | Di-n-hexyl phthalate | Di-n-propyl phthalate |
| 14) | Di-iso-hexyl phthalate | Di-n-propyl phthalate |
| 15) | Bis(2-ethylhexyl) phthalate | Di-iso-butyl phthalate |
| 16) | Di-n-octyl phthalate | Di-iso-butyl phthalate |
| 17) | Di-iso-decyl phthalate | Di-iso-butyl phthalate |
| 18) | Butylbenzyl phthalate | Di-iso-butyl phthalate |
| 19) | Di-n-hexyl phthalate | Di-iso-butyl phthalate |
| 20) | Di-iso-hexyl phthalate | Di-iso-butyl phthalate |
| 21) | Bis(2-ethylhexyl) phthalate | Di-n-butyl phthalate |
| 22) | Di-n-octyl phthalate | Di-n-butyl phthalate |
| 23) | Di-iso-decyl phthalate | Di-n-butyl phthalate |
| 24) | Butylbenzyl phthalate | Di-n-butyl phthalate |
| 25) | Di-n-hexyl phthalate | Di-n-butyl phthalate |
| 26) | Di-iso-hexyl phthalate | Di-n-butyl phthalate |
| 27) | Bis(2-ethylhexyl) phthalate | Diethyl phthalate and di-n-butyl phthalate |
| 28) | Bis(2-ethylhexyl) phthalate | Diethyl phthalate and di-iso-butyl phthalate |

As mentioned above, at least two diesters of aromatic dicarboxylic acid selected in such a manner that the difference in the sum of the number of carbon atoms in two alkyl groups in respective diesters of aromatic dicarboxylic acid is at least 4 are preferably used in combination. In particular, there are preferably used in combination a diester of phthalic acid the total number of carbon atoms in two alkyl groups of which is at least 10 as the component (c1) and a diester of phthalic acid the total number of carbon atoms in two alkyl groups of which is not more than 8 as the component (c2).

In the preparation of the solid catalyst component (A), the foregoing diester of aromatic dicarboxylic acid as an essential component may be used in combination with other electron donor compounds. As such an electron donor compound there may be used an organic compound containing oxygen or nitrogen. Examples of such an organic compound include alcohols, phenols, ethers, esters, ketones, acid halides, aldehydes, amines, amides, nitrites, isocyanates, and organic silicon compound containing Si-O-C bond. Specific examples of these organic compounds include alcohols such as methanol, ethanol, propanol, butanol, pentanol, hexanol, octanol, 2-ethylhexanol and dodecanol, phenols such as phenol and cresol, ethers such as methyl ether, ethyl ether, propyl ether, butyl ether, amyl ether and diphenyl ether, monocarboxylic acid esters such as methyl formate, ethyl acetate, vinyl acetate, propyl acetate, octyl acetate, cyclohexyl acetate, ethyl propionate, ethyl butyrate, methyl benzoate, ethyl benzoate, propyl benzoate, butyl benzoate, octyl benzoate, cyclohexyl benzoate, phenyl benzoate, methyl p-toluylate, ethyl p-toluylate, methyl anisate and ethyl anisate, diesters of dicarboxylic acid such as diethyl maleate, dibutyl maleate, dimethyl adipate, diethyl adipate, dipropyl adipate, dibutyl adipate, dimethyl adipate, diisodecyl adipate and dioctyl adipate, ketones such as acetone, methyl ethyl ketone, methyl butyl ketone, acetophenone and benzophenone, acid halides such as phthalic acid dichloride and terephthalic acid dichloride, aldehydes such as acetaldehyde, propionaldehyde, octylaldehyde and benzaldehyde, amines such as methylamine, ethylamine, tributylamine, piperidine, aniline and pyridine, and nitriles such as acetonitrile, benzonitrile and trinitrile.

Specific examples of the organic silicon compound containing Si-O-C bond include trimethylmethoxysilane, trimethylethoxysilane, tri-n-propylmethoxysilane, tri-n-propylethoxysilane, tri-n-butylmethoxysilane, tri-isobutylmethoxysilane, tri-t-butylmethoxysilane, tri-n-butylethoxysilane, tricyclohexylmethoxysilane, tricyclohexylethoxysilane, dimethyldimethoxysilane, dimethyldiethoxysilane, di-n-propyldimethoxysilane, di-iso-propyldimethoxysilane, di-n-propyldiethoxysilane, di-iso-propyldiethoxysilane, di-n-butyldimethoxysilane, di-iso-butyldimethoxysilane, di-t-butyldimethoxysilane, di-n-butyldiethoxysilane, n-butylmethyldimethoxysilane, bis(2-ethylhexyl)dimethoxysilane, bis(2-ethylhexyl)diethoxysilane, dicyclohexyldimethoxysilane, dicyclohexyldiethoxysilane, dicyclopentyldimethoxysilane, dicyclopentyldiethoxysilane, cyclohexylmethyldimethoxysilane, cyclohexylmethyldiethoxysilane, cyclohexylethyldimethoxysilane, cyclohexyl(iso-propyl)dimethoxysilane, cyclohexylethyldiethoxysilane, cyclopentylmethyldimethoxysilane, cyclopentylethyldiethoxysilane, cyclopentyl(iso-propyl)dimethoxysilane, cyclohexyl(n-pentyl)-dimethoxysilane, cyclopentyl(iso-butyl)dimethoxysilane, cyclohexylcyclopentyldimethoxysilane, cyclohexylcyclopentyldiethoxysilane, diphenyldimethoxysilane, diphenyldiethoxysilane, phenylmethyldimethoxysilane, phenylmethyldiethoxysilane, phenylethyldimethoxysilane, phenylethyldiethoxysilane, cyclohexyldimethylmethoxysilane, cyclohexyldimethylethoxysilane, cyclohexyldiethylmethoxysilane, cyclohexyldiethylethoxysilane, 2-ethylhexyltrimethoxysilane, 2-ethylhexyltriethoxysilane, cyclohexyl(n-pentyl)diethoxysilane, cyclopentylethyldimethoxysilane, cyclopentylmethyldiethoxysilane, cyclohexyl(n-propyl)dimethoxysilane, cyclohexyl(n-butyl)dimethoxysilane, cyclohexyl(n-propyl)diethoxysilane, cyclohexyl(n-butyl)diethoxysilane, methyltrimethoxysilane, methyltriethoxysilane, ethyltrimethoxysilane, ethyltriethoxysilane, n-propyltrimethoxysilane, n-propyltriethoxysilane, iso-propyltrimethoxysilane, iso-propyltriethoxysilane, n-butyltrimethoxysilane, iso-butyltrimethoxysilane, t-butyltrimethoxysilane, n-butyltriethoxysilane, cyclohexyltrimethoxysilane, cyclohexyltriethoxysilane, cyclopentyltrimethoxysilane, cyclopentyltriethoxysilane, vinyltrimethoxysilane, vinyltriethoxysilane, 2-ethylhexyltrimethoxysilane, 2-ethylhexyltriethoxysilane, phenyltrimethoxysilane, phenyltriethoxysilane, tetramethoxysilane, and tetraethoxysilane.

The cyclic or chain polysiloxane (hereinafter occasionally referred to as "component (d)") to be used as component (d) in the preparation of the solid catalyst component (A) of the present invention will be further described hereinafter. As such cyclic polysiloxanes there may be used one or more cyclic polysiloxanes represented by the following general formula [I]:

wherein $R^6$ to $R^{11}$ each independently represents a hydrogen atom, methyl group or ethyl group; and n represents an integer of from 1 to 20.

Preferred among the cyclic polysiloxanes represented by the foregoing general formula [I] are those wherein n is from 1 to 10, preferably from 1 to 6. Specific examples of such cyclic polysiloxanes include hexamethylcyclotrisiloxane, octamethylcyclotetrasiloxane, decamethylcyclopentasiloxane, 2,4,6-trimethylcyclotrisiloxane, and 2,4,6,8-tetramethylcyclotetrasiloxane. These cyclic polysiloxanes may be used singly or in combination of two or more of them.

As chain polysiloxanes there may be used one or more compounds represented by the following general formula [II]:

In the foregoing general formula [II], x represents an average polymerization degree of from 2 to 30,000. Most of $R^{12}$ to $R^{19}$ each represents a methyl group. Some of $R^{12}$ to $R^{19}$ each represents a phenyl group, higher aliphatic acid residue, epoxy-containing group or polyoxyalkylene-substituted group.

The polysiloxane is known generically as silicone oil. It is a chain polysiloxane having a viscosity of from 2 to 10,000 cSt, preferably from 2 to 1,000 cSt, more preferably from 3 to 500 cSt, at 25° C. which normally stays liquid or viscous.

Examples of the foregoing chain polysiloxane include dimethyl polysiloxane, methyl phenyl polysiloxane, higher aliphatic acid-substituted dimethylsiloxane, epoxy-substituted dimethylsiloxane, and polyoxyalkylene-substituted dimethylsiloxane.

Specific examples of these polysiloxanes include TSF400, TSF401, TSF404, TSF405, TSF4045, TSF410, TSF411, TSF433, TSF437, TSF4420, TSF451-5A, TSF451-10A, TSF451-50A, TSF451-100, TSF483, and TSF484 [available from Toshiba Silicone Co., Ltd.], and KF96, KF96L, KF96H, KF69, KF92, KF961, KF965, KF56, KF99, KF94, KF995, KF105, KF351, HIVAC-F4, and HIVAC-F5 [available from Shin-Etsu Chemical Co., Ltd.].

The reaction of one or more of the foregoing cyclic or chain polysiloxanes in combination with other components (a) to (d) makes it possible to obtain a solid catalyst component having a high activity which can provide a polymer having a high stereoregularity, an extremely small content of fine powder and a high bulk density. These cyclic or chain polysolixanes may be dissolved in an organic solvent such as toluene, xylene, hexane and heptane before use.

The solid catalyst component (A) of the present invention may be prepared by allowing the components (a), (b), (c) and (d) to come into contact with one another. This preparation process can proceed in the absence of inert organic solvent but preferably in the presence of inert organic solvent taking into account the ease of operation. Examples of the inert organic solvent employable herein include saturated hydrocarbon such as hexane, heptane and cyclohexane, aromatic hydrocarbon such as benzene, toluene, xylene and ethylbenzene, and halogenated hydrocarbon such as orthodichlorobenzene, methylene chloride, carbon tetrachloride and dichloroethane. In particular, aromatic hydrocarbons having a boiling point of from 90° C. to 150° C. are preferred. Specific examples of such aromatic hydrocarbons include toluene, xylene, and ethylbenzene. The proportion of the component (b) is from 0.1 to 200 ml, preferably from 0.5 to 100 ml per g of the component (a). The proportion of the component (c) is from 0.01 to 3.0 g, preferably from 0.1 to 1.5 g per g of the component (a). The proportion of the component (d) is from 0.01 to 20 g, preferably from 0.05 to 10 g per g of the component (a).

If at least two components (c) are used as mentioned above, the proportion of the component (c1) is from 0.01 to 2.0 g, preferably from 0.1 to 1.0 g per g of the component (a), and the proportion of the component (c2) is from 0.01 to 1.0 g, preferably from 0.1 to 0.5 g per g of the component (a).

The amount of the inert organic solvent to be used is not specifically limited. It is preferably from 0.1 to 10 times by volume the component (b) taking into account operational conditions. These components may be added batchwise during contact. Alternatively, one or more compounds may be properly selected.

The contact of these components may be effected in an atmosphere of inert gas free of water with stirring in a vessel equipped with an agitator. The contact of these components may be effected at a relatively low temperature in the vicinity of room temperature if they are merely stirred and mixed or subjected to dispersion or suspension to undergo modification. If these components are reacted after contacted to obtain a reaction product, the contact is preferably effected within a temperature range of from 40° C. to 130° C. If the reaction temperature falls below 40° C., the reaction cannot proceed sufficiently, resulting in the production of a solid catalyst component having insufficient properties. On the contrary, if the reaction temperature exceeds 130° C., the solvent used remarkably evaporates, making it difficult to control the reaction. The reaction time is at least 1 minute, preferably at least 10 minutes, more preferably at least 30 minutes.

In the preparation of the solid catalyst component (A) of the present invention, the components (a), (b), (c) and (d) are allowed to come in contact with one another. The order of contact of these components is arbitrary and not specifically limited. Specific examples of the procedure of addition of these components will be given below.

1. The components (a), (b), (c) and (d) are allowed to come in contact with one another at the same time.
2. The component (d) is allowed to come in contact with a solid reaction product obtained by allowing the components (a), (b) and (c) to come in contact with one another.
3. The component (d) is allowed to come in contact with a solid reaction product obtained by allowing the components (a), (b) and (c) to come in contact with one another. The component (b) is then repeatedly allowed to come in contact with the resulting reaction product.
4. The components (b) and (d) are allowed to come in contact with a solid reaction product obtained by allowing the components (a) and (c) to come in contact with each other.

5. The components (b) and (d) are allowed to come in contact with a solid reaction product obtained by allowing the components (a) and (c) to come in contact with each other. The component (b) is then repeatedly allowed to come in contact with the resulting reaction product.
6. The components (c) and (d) are allowed to come in contact with a solid reaction product obtained by allowing the components (a) and (b) to come in contact with each other. The component (b) is then repeatedly allowed to come in contact with the resulting reaction product.
7. The components (c) and (d) are allowed to come in contact with a solid reaction product obtained by allowing the components (a) and (b) to come in contact with each other.
8. The component (c) is allowed to come in contact with a solid reaction product obtained by allowing the components (a) and (b) to come in contact with each other. The component (b) is then repeatedly allowed to come in contact with the resulting reaction product. The component (d) is then allowed to come in contact with the resulting reaction product.
9. The components (c) and (d) are allowed to come in contact with a solid reaction product obtained by allowing the components (a) and (b) to come in contact with each other. The components (b) and (d) are then repeatedly allowed to come in contact with the resulting reaction product.

The order of contact of the component (d) in the reaction of the various components is arbitrary. Preferably, the component (d) is allowed to come in contact with a solid reaction product obtained by allowing the components (a), (b) and (c) to come in contact with one another to enhance the bulk density of the polymer thus obtained and minimize the content of fine powder in the polymer thus obtained. In the foregoing reaction, the component (b) is repeatedly allowed to come in contact with the resulting solid reaction product within a temperature range of from 40° C. to 130° C. for 1 minute or longer, preferably 5 minutes or longer, more preferably 10 minutes or longer. In this case, the component (b) may be added as it is or may be diluted properly with the foregoing inert organic solvent before being added. The latter addition method is preferred. In a preferred embodiment of the present invention, the solid reaction product obtained by contact and reaction of the various components at the previous stage is washed with the foregoing inert organic solvent before the repeated contact with the component (b).

Alternatively, the suspension of the solid reaction product obtained by allowing the components (a), (b) and (c) to come in contact with one another or the solid reaction product obtained by allowing the components (a) and (b) to come in contact with each other may be heated to a temperature where it is then allowed to undergo reaction with the component (c) and/or (d). The average rate of heat rise from the temperature at which the various components are suspended first to the reaction is predetermined to a range of from 0.1 to 20° C./min., more preferably from 0.2 to 10° C./min., particularly preferably from 0.3 to 8° C./min. If the rate of heat rise is too low, the polymer produced in the presence of the solid catalyst component thus obtained exhibits an insufficient bulk density. On the contrary, if the rate of heat rise is too high, the resulting reaction heat is so high as to destroy the particles. The solid catalyst component thus prepared has an increased content of fine powder. As a result, the polymer produced in the presence of the solid catalyst component has an increased content of fine powder.

Further, if two or more components (c) are used, the component (c1) is first allowed to come in contact with the component (a), and the component (c2) is then allowed to come in contact with the component (a). Preferably, the contact of the components (a), (b) and (c1) is followed by the contact of the component (c2). In this process, the components (c1) and (c2) may be each collectively added or may be each batchwise added. Further, two or more components (c1) and two or more components (c2) may be used.

Examples of the procedure of contact of the various components in the case where two or more components (c) are used will be given below.

1. The component (d) is allowed to come in contact with a solid reaction product obtained by allowing the components (a), (b) and (c1) to come in contact with one another, and then allowing the component (c2) to come in contact with the resulting reaction product.
2. The component (d) is allowed to come in contact with a solid reaction product obtained by allowing the components (a), (b) and (c1) to come in contact with one another, and then allowing the component (c2) to come in contact with the resulting reaction product. The component (b) is then repeatedly allowed to come in contact with the resulting reaction product.
3. The components (b), (c2) and (d) are allowed to come in contact with a solid reaction product obtained by allowing the components (a) and (c1) to come in contact with each other.
4. The components (b), (c2) and (d) are allowed to come in contact with a solid reaction product obtained by allowing the components (a) and (c1) to come in contact with each other. The component (b) is then repeatedly allowed to come in contact with the resulting reaction product.
5. The component (c1) is allowed to come in contact with a solid reaction product obtained by allowing the components (a) and (b) to come in contact with each other. The component (c2) is then allowed to come in contact with the resulting reaction product. The component (d) is then allowed to come in contact with the resulting reaction product. The component (b) is then repeatedly allowed to come in contact with the resulting reaction product.
6. The components (c1) and (d) are allowed to come in contact with a solid reaction product obtained by allowing the components (a) and (b) to come in contact with each other. The components (b) and (c2) are then allowed to come in contact with the resulting reaction product.
7. The component (c1) is allowed to come in contact with a solid reaction product obtained by allowing the components (a) and (b) to come in contact with each other. The component (b) is repeatedly allowed to come in contact with the resulting reaction product. The components (c2) and (d) are then allowed to come in contact with the resulting reaction product.
8. The components (c1) and (d) are allowed to come in contact with a solid reaction product obtained by allowing the components (a) and (b) to come in contact with each other. The components (b), (c2) and (d) are repeatedly allowed to come in contact with the resulting reaction product.

The temperature at which the component (c) is allowed to come in contact with the other component(s) or the reaction product is not specifically limited but is preferably not higher than 130° C. If two or more components (c) are used, the component (c1) is allowed to come in contact with the other component(s) or the reaction product at a temperature of lower than 70° C., preferably from 0° C. to 55° C., while the component (c2) is allowed to come in contact with the other component(s) or the reaction product at a temperature of from 70° C. to 130° C. However, the temperature at which the component (c2) is allowed to come in contact with the other component(s) or the reaction product is not specifically limited as far as the contact of the component (c2) is effected after the contact of the component (c1).

The foregoing process for the preparation of a solid catalyst component which comprises allowing two or more diesters of aromatic dicarboxylic acid, one having a great total number of carbon atoms in two ester substituents, in particular at least 10, and the other having a small total number of carbon atoms in two ester substituents, in particular not more than 8, i.e., components (c1) and (c2) to come in contact with the other component(s) or the reaction product in an order as described above, that is, in this order makes it possible to inhibit the agglomeration of solid particles during preparation. Further, the solid catalyst component finally obtained has a reduced content of fine powder. As a result, the use of the solid catalyst component thus prepared makes it possible to produce a polymer having a small content of coarse powder and fine powder and a high bulk density.

Specific examples of the process for the preparation of the solid catalyst component (A) will be given below.

Example 1: Diethoxymagnesium is suspended as the component (a) in an aromatic hydrocarbon solvent such as toluene within a temperature range of from −10° C. to 30° C. To the suspension thus obtained is added titanium tetrachloride as the component (b). In this procedure, the amount of titanium tetrachloride is preferably not more than ½ by volume of the solvent in which the component (a) is suspended. Subsequently, to the suspension is added dibutyl phthalate as the component (c). The temperature at which this procedure is effected is the same as used in the suspension of the component (a) in toluene. The suspension is heated to a temperature of from 50° C. to 110° C. where decamethylcyclopentasiloxane or dimethylpolysiloxane is then added thereto as the component (d). Thereafter, the reaction system is heated to a temperature of from 100° C. to 120° C. where it is then kept to undergo reaction for 30 minutes to 3 hours to obtain a solid reaction product. The solid reaction product is then washed with toluene within a temperature range of from 40° C. to 130° C. for 1 minute or longer. To the resulting solid reaction product are then added toluene and titanium tetrachloride so that they are allowed to come in contact with one another. The reaction system is heated to a temperature of from 100° C. to 120° C. where it is then kept to undergo reaction for 30 minutes to 3 hours. The solid reaction product is washed with heptane to obtain a solid catalyst component (A).

Example 2: Diethoxymagnesium is suspended as the component (a) in an aromatic hydrocarbon solvent such as toluene within a temperature range of from −10° C. to 30° C. To the suspension thus obtained is added titanium tetrachloride as the component (b). In this procedure, the amount of titanium tetrachloride is preferably not more than ½ by volume of the solvent in which the component (a) is suspended. Subsequently, to the suspension is added di-iso-octyl phthalate as the component (c1) within a temperature range of from 30° C. to 60° C. Further, to the suspension is added diethyl phthalate as the component (c2) within a temperature range of from 60° C. to 80° C. Subsequently, the suspension is heated to a temperature of from 80° C. to 110° C. where decamethylcyclopentasiloxane or dimethylpolysiloxane is then added thereto as the component (d). Thereafter, the reaction system is further heated to a temperature of from 100° C. to 120° C. where it is then kept to undergo reaction for 30 minutes to 3 hours to obtain a solid reaction product. The solid reaction product is washed with titanium tetrachloride diluted with toluene and then with toluene within a temperature range of from 40° C. to 130° C. for 1 minute or longer. To the resulting solid reaction product are then added toluene and titanium tetrachloride so that they are allowed to come in contact with one another. The reaction system is heated to a temperature of from 100° C. to 120° C. where it is then kept to undergo reaction for 30 minutes to 3 hours. The solid reaction product is washed with heptane to obtain a solid component (A).

Example 3: Diethoxymagnesium as the component (a) and di-iso-decyl phthalate as the component (c1) are allowed to come in contact with each other in an aromatic hydrocarbon solvent such as toluene. To the resulting reaction product is then added titanium tetrachloride as the component (b) within a temperature range of from −10° C. to 30° C. In this procedure, the amount of titanium tetrachloride is preferably not more than ½ by volume of the solvent in which the component (a) is suspended. The suspension is heated to a temperature of from 60° C. to 80° C. where di-iso-butyl phthalate as the component (c2) is then added thereto. Thereafter, to the suspension is added decamethylcyclopentasiloxane or dimethylpolysiloxane as the component (d) within a temperature range of from 80° C. to 110° C. Thereafter, the suspension is heated to a temperature of from 100° C. to 120° C. where it is then kept to undergo reaction for 30 minutes to 3 hours to obtain a solid reaction product. The solid reaction product is washed with titanium tetrachloride diluted with toluene and then with toluene within a temperature range of from 40° C. to 130° C. for 1 minute or longer. To the resulting solid reaction product are then added toluene, titanium tetrachloride and diethyl phthalate so that they are allowed to come in contact with one another. The reaction system is heated to a temperature of from 100° C. to 120° C. where it is then kept to undergo reaction for 30 minutes to 3 hours. The solid reaction product is washed with heptane to obtain a solid component (A).

The solid catalyst component (A) of the present invention thus prepared is preferably washed with an inert organic solvent such as heptane to remove unreacted substances. The solid catalyst component (A) thus washed is then combined with the components (B) and (C) described later after dried or as it is to produce a catalyst for polymerization of olefins of the present invention.

As the organic aluminum compound (B) to be used in the present invention there may be used one represented by the general formula: $R^3_q AlQ_{3-q}$ (in which $R^3$ represents a $C_{1-4}$ alkyl group; Y represents a hydrogen atom, chlorine atom, bromine atom or iodine atom; and q represents a real number of more than 0 to not more than 3).

Examples of the organic aluminum compound (B) include triethylaluminum, diethylaluminum chloride, tri-iso-butylaluminum, diethylaluminum bromide, and ethylaluminum hydride. These organic aluminum compounds may be used singly or in combination of two or more of them. Preferred among these organic aluminum compounds are triethylaluminum, and tri-iso-butylaluminum.

As the organic silicon compound (C) to be used in the present invention there may be used an organic silicon compound represented by the general formula $R^4_r Si(OR^5)_{4-r}$ (in which $R^4$'s may be the same or different and each represents a $C_{1-12}$ alkyl, cycloalkyl, phenyl, vinyl, allyl or aralkyl group; $R^5$'s may be the same or different and each represents a $C_{1-4}$ alkyl, cycloalkyl, phenyl, vinyl, allyl or aralkyl group; and r represents 0 or an integer of from 1 to 3).

Examples of the organic silicon compound (C) include phenylalkoxysilane, alkylalkoxysilane, phenylalkylalkoxysilane, cycloalkylakoxysilane, cycloalkylalkylalkoxysilane, and alkoxysilane.

Specific examples of the foregoing organic silicon compound (C) include trimethylmethoxysilane, trimethylethoxysilane, tri-n-propylmethoxysilane, tri-n-propylethoxysilane, tri-n-butylmethoxysilane, tri-iso-butylmethoxysilane, tri-t-butylmethoxysilane, tri-n-butylethoxysilane, tricyclohexylmethoxysilane, tricyclohexylethoxysilane, dimethyldimethoxysilane, dimethyldiethoxysilane, di-n-propyldimethoxysilane, di-iso-propyldimethoxysilane, di-n-propyldiethoxysilane, di-iso-propyldiethoxysilane, di-n-butyldimethoxysilane, di-iso-butyldimethoxysilane, di-t-butyldimethoxysilane, di-n-butyldiethoxysilane, n-butylmethyldimethoxysilane, bis(2-ethylhexyl)dimethoxysilane, bis(2-ethylhexyl) diethoxysilane, dicyclohexyldimethoxysilane, dicyclohexyldiethoxysilane, dicyclopentyldimethoxysilane, dicyclopentyldiethoxysilane, cyclohexyliethyldimethoxysilane, cyclohexylmethyldiethoxysilane, cyclohexylethyldimethoxysilane, cyclohexyl(iso-propyl) dimethoxysilane, cyclohexylethyldiethoxysilane, cyclopentyl:ethyldimethoxysilane, cyclopentylmethyldiethoxysilane, cyclopentylethyldiethoxysilane, cyclopentyl (iso-propyl )dimethoxysilane, cyclohexyl (n-pentyl) dimethoxysilane, cyclohexyl(n-pentyl)diethoxysilane, cyclopentyl(iso-butyl) dimethoxysilane, cyclohexyl(n-propyl)-dimnethoxysilane, cyclohexyl(n-propyl)diethoxysilane, cyclohexyl(iso-propyl) diethoxysilane, cyclohexyl(n-butyl )dimethoxysilane, cyclohexyl(n-butyl)diethoxysilane, cyclohexyl(iso-butyl) dimethoxysilane, diphenyldimethoxysilane, diphenyldiethoxysilane, phenylmethyldiiethoxysilane, phenylmethyldiethoxysilane, phenylethyldimethoxysilane, phenylethyldiethoxysilane, cyclohexyldimethylmethoxysilane, cyclohexyldimethylethoxysilane, cyclohexyldiethylmethoxysilane, cyclohexyldiethylethoxysilane, 2-ethylhexyltrimethoxysilane, 2-ethylhexyltriethoxysilane, methyltrimethoxysilane, methyltriethoxysilane, ethyltrimethoxysilane, ethyltriethoxysilane, n-propyltrimethoxysilane, n-propyltriethoxysilane, iso-propyltrimethoxysilane, iso-propyltriethoxysilane, n-butyltrimethoxysilane, iso-butyltrimethoxysilane, t-butyltrimethoxysilane, n-butyltriethoxysilane, cyclohexyltrimethoxysilane, cyclohexyltriethoxysilane, cyclopentyltrimethoxysilane, cyclopentyltriethoxysilane, vinyltrimethoxysilane, vinyltriethoxysilane, 2-ethylhexyltrimethoxysilane, 2-ethylhexyltriethoxysilane, phenyltrimethoxysilane, phenyltriethoxysilane, tetramethoxysilane, tetraethoxysilane, cyclohexylcyclopentyldimethoxysilane, cyclohexylcyclopentyldiethoxysilane, cyclohexylcyclopentylpropoxysilane, 3-methylcyclohexylcyclopentyldimethoxysilane, 4-methylcyclohexylcyclopentyldimethoxysilane, 3,5-dimethylcyclohexylcyclopentyldimethoxysilane, 3-methylcyclohexylcyclohexyldimethoxysilane, bis(3-methylcyclohexyl)dimethoxysilane, 4-methylcyclohexylcyclohexyldimethoxysilane, bis(4-methylcyclohexyl)dimethoxysilane, 3,5-dimethylcyclohexylcyclohexyldimethoxysilane, and bis(3, 5-dimethylcyclohexyl)dimethoxysilane.

Preferred among these organic silicon compounds are di-n-propyldimethoxysilane, di-iso-propyldimethoxysilane, di-n-butyldimethoxysilane, di-iso-butyldimethoxysilane, di-t-butyldimethoxysilane, di-n-butyldiethoxysilane, t-butyltrimethoxysilane, dicyclohexyldimethoxysilane, dicyclohexyldiethoxysilane, cyclohexylmethyldimethoxysilane, cyclohexylmethyldiethoxysilane, cyclohexylethyldimethoxysilane, cyclohexylethyldiethoxysilane, dicyclopentyldimethoxysilane, dicyclopentyldiethoxysilane, cyclopentylmethyldimethoxysilane, cyclopentylmethyldiethoxysilane, cyclopentylethyldiethoxysilane, cyclohexylcyclopentyldimethoxysilane, cyclohexylcyclopentyldiethoxysilane, 3-methylcyclohexylcyclopentyldimethoxysilane, 4-methylcyclohexylcyclopentyldimethoxysilane, and 3,5-dimethylcyclohexylcyclopentyldimethoxysilane. These organic silicon compounds (C) may be used singly or in combination of two or more of them.

In the polymerization process of the present invention, the polymerization of olefins is accomplished by the polymerization or copolymerization of olefins in the presence of a catalyst made of the foregoing solid catalyst component (A), organic aluminum compound (B) and organic silicon compound (C). The ratio of the various components to be used is arbitrary and not specifically limited unless the effects of the present invention are impaired. In general, the proportion of the organic aluminum compound (B) is from 1 to 1,000 mols, preferably from 50 to 500 mols per mol of titanium atom in the solid catalyst component (A). The proportion of the organic aluminum compound (C) is from 0.0020 to 2 mols, preferably from 0.01 to 0.5 mols per mol of the component (B).

The catalyst for polymerization of olefins of the present invention is formed by the foregoing solid catalyst component (A), organic aluminum compound (B) and organic silicon compound (C). As the electron donor (external electron donor) to be used during polymerization there may be used an organic compound containing oxygen or nitrogen in combination with the foregoing organic silicon compound (C). Specific examples of such an organic compound include alcohols, phenols, ethers, esters, ketones, acid halides, aldehydes, amines, amides, nitriles, and isocyanates.

Specific examples of these organic compounds include alcohols such as methanol, ethanol, propanol, butanol, pentanol, hexanol, octanol, 2-ethylhexanol and dodecanol, phenols such as phenol and cresol, ethers such as methyl ether, ethyl ether, propyl ether, butyl ether, amyl ether and diphenyl ether, monocarboxylic acid esters such as methyl formate, ethyl acetate, vinyl acetate, propyl acetate, octyl acetate, cyclohexyl acetate, ethyl propionate, ethyl butyrate, methyl benzoate, ethyl benzoate, propyl benzoate, butyl benzoate, octyl benzoate, cyclohexyl benzoate, phenyl benzoate, methyl p-toluylate, ethyl p-toluylate, p-methoxyethyl benzoate, p-ethoxyethyl benzoate, methyl anisate and ethyl anisate, dicarboxylic acid esters such as diethyl maleate, dibutyl maleate, dimethyl adipate, diethyl adipate, dipropyl adipate, dibutyl adipate, dimethyl adipate, diisodecyl adipate, dioctyl adipate, dimethyl phthalate, diethyl phthalate, dipropyl phthalate, dibutyl phthalate, dipentyl phthalate, dihexyl phthalate, diheptyl phthalate, dioctyl phthalate, dinonyl phthalate and didecyl phthalate, ketones such as acetone, methyl ethyl ketone, methyl butyl ketone, acetophenone and benzophenone, acid halides such as phthalic acid dichloride and terephthalic acid dichloride, aldehydes such as acetaldehyde, propionaldehyde, octylaldehyde and benzaldehyde, amines such as methylamine, ethylamine, tributylamine, piperidine, aniline and pyridine, and nitriles such as acetonitrile, benzonitrile and toluinitrile.

Figures 1A, 1B:
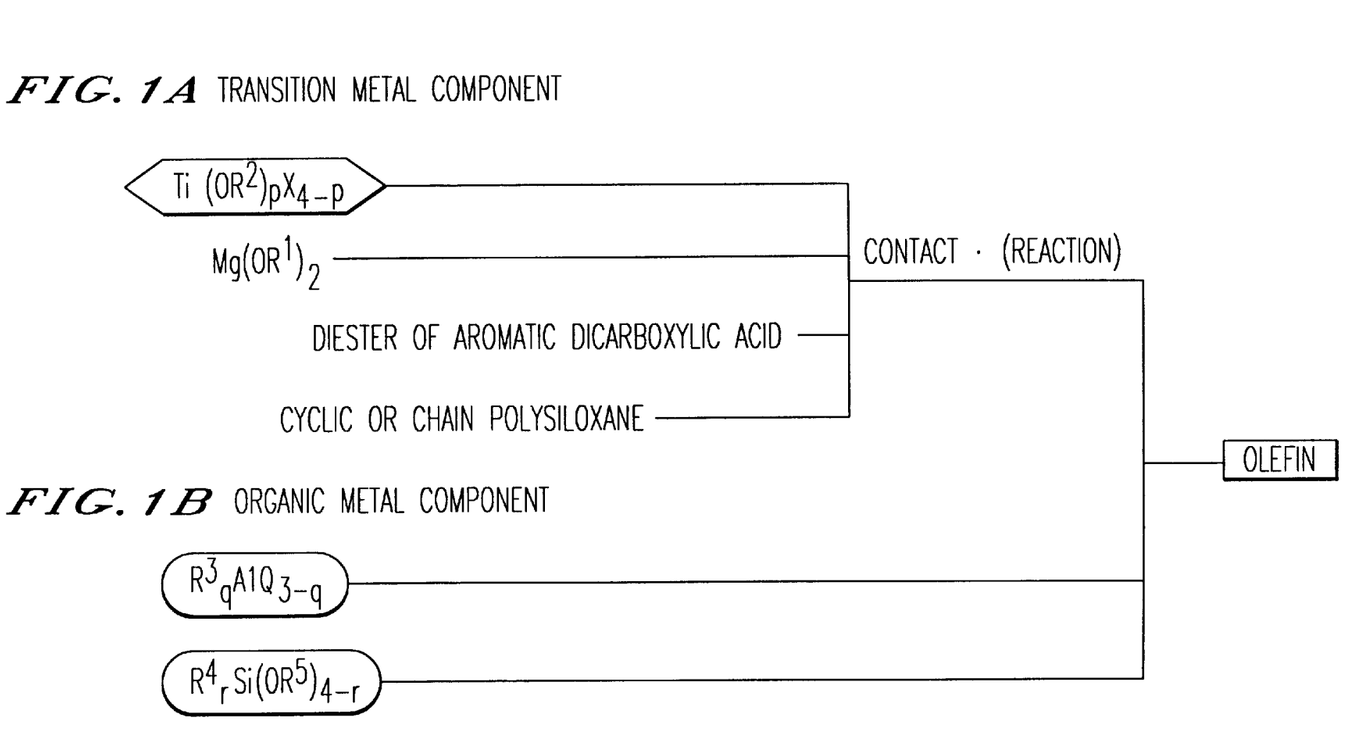
FIG. 1 is a flow chart illustrating the process for the production of the catalyst for polymerization of olefins according to the present invention.

A process for the preparation of the catalyst for polymerization of olefins from the foregoing solid catalyst component (A), and organic metal compounds (B) and organic silicon compound (C) is shown in FIG. 1.

Examples of the olefins to be homopolymerized or copolymerized in the presence of the catalyst of the present invention include ethylene, propylene, 1-butene, and 4-methyl-1-pentene. The catalyst of the present invention is particularly suitable for the polymerization of propylene. The polymerization of olefins in the presence of the catalyst made of the foregoing solid catalyst component (A), organic aluminum compound (B) and organic silicon compound (C) is preferably preceded by prepolymerization to further enhance the catalytic activity and the stereoregularity, particle properties of the polymer thus produced and the like. As the monomers to be used in the prepolymerization there may be used ethylene and propylene as well as monomers such as styrene and vinylcyclohexane. The polymerization is carried out by slurry polymerization, liquid polymerization or gas phase polymerization. During the polymerization, hydrogen may be used as a molecular weight modifier. The polymerization temperature is not higher than 200° C., preferably not higher than 100° C. The polymerization pressure is not higher than 10 MPa, preferably not higher than 5 MPa, more preferably not higher than 2.5 MPa.

The present invention will be further described in the following examples as compared with the comparative examples.

EXAMPLE 1

<Preparation of Solid Catalyst Component>

Into a 500-ml round flask equipped with an agitator in which the air within had been thoroughly replaced by nitrogen gas were charged 10 g of diethoxymagnesium (bulk density: 0.23 g/ml; specific surface area: 21.5 m$^2$/g; sphericity (l/w): 1.10; average particle size: 28 $\mu$m; in (D90/D10): 1.10; content of fine powder having a particle size of not more than 5 $\mu$m: 5%) and 90 ml of toluene to make a suspension. The suspension thus obtained was then cooled to a temperature of 3° C. The suspension was then added to a solution of 30 ml of toluene and 20 ml of titanium tetrachloride. To the suspension was then added 3.6 ml of di-n-butyl phthalate while the temperature thereof was kept at 3° C. The suspension was heated at an average rate of 1° C./min. to a temperature of 100° C. where 3 ml of decamethylcyclopentasiloxane was then added thereto. The temperature of the reaction system was raised to 110° C. where the suspension was then reacted for 2 hours. After the termination of the reaction, the supernatant solution was removed. The resulting solid reaction product was then washed with 100 ml of toluene three times at a temperature of 110° C. Thereafter, to the resulting solid reaction product were added 80 ml of toluene and 20 ml of titanium tetrachloride. The mixture was then processed with stirring at a temperature of 110° C. for 2 hours. Thereafter, the resulting solid reaction product was washed with 100 ml of n-heptane of 40° C. 8 times to obtain a solid catalyst component. The solid catalyst component was then measured for Ti content. The result was 1.9% by weight.

<Preparation of Polymerization Catalyst and Polymerization>

Into a 2 l autoclave equipped with an agitator in which the air within had been completely replaced by nitrogen gas were charged 1.32 mmol of triethylaluminum, 0.13 mmol of cyclohexylmethyldimethoxysilane and the foregoing solid catalyst component in an amount of 0.0033 mmol as calculated in terms of titanium atom to form a polymerization catalyst. Into the autoclave were then charged 1.5 l of hydrogen gas and 1.4 l of liquid propylene. The mixture was then allowed to undergo polymerization reaction at a temperature of 70° C. for 1 hour to obtain a solid polymer 1. The properties of the catalyst thus obtained and the polymer obtained by the polymerization in the presence of the catalyst are set forth in Table 1.

The properties of the polymer set forth in Table 1 had been determined as follows. In some detail, after the termination of the polymerization reaction, the polymer thus produced was measured for weight (a). The polymer was then extracted with boiling n-heptane for 6 hours. The resulting undissolved polymer was then measured for weight (b). The polymerization activity and the yield of the entire crystalline polymer were determined by the following equations:

$$\text{Polymerization activity} = \frac{(a)(g)}{\text{Solid catalyst component }(g)}$$

$$\text{Yield of entire crystalline polymer} = \frac{(b)}{(a)} \times 100 \ (\%)$$

The melt index (MI), bulk density and index of occurrence of fine powder of the polymer thus produced are also set forth in Table 1. The index of occurrence of fine powder (FI) was determined as follows.

Into a 1,800 ml stainless steel autoclave equipped with an agitator in which the air within had been thoroughly dried with nitrogen gas and then replaced by propylene gas was charged 700 ml of n-heptane. Into the autoclave were then charged 2.10 mmol of triethylaluminum and 0.21 mmol of cyclohexylmethyldimethoxysilane while the reaction system was kept in an atmosphere of propylene gas. The reaction system was heated to a temperature of 75° C. where the foregoing solid catalyst component was then charged thereinto in an amount of 0.007 mmol as calculated in terms of titanium atom. Thereafter, 150 ml of hydrogen was charged into the autoclave. The mixture was then subjected to polymerization under a propylene pressure of 0.7 MPa for 3 hours. The pressure drop caused by the progress of the polymerization was compensated for by the continuous supply of propylene alone to keep the system pressure constant during the polymerization. In accordance with the foregoing polymerization process, propylene was polymerized. The polymer thus produced was withdrawn by filtration, and then dried under reduced pressure to obtain a solid polymer 2.

The index of occurrence of fine powder (FI) was calculated by the following equation:

$$FI = \frac{\begin{array}{c}\text{Particle diameter}\\\text{of solid polymer 2}\\\text{at accumulated}\\\text{particle size of 4\%}\end{array}}{\begin{array}{c}\text{Average particle}\\\text{diameter of solid}\\\text{polymer 2}\end{array}} \times \frac{\begin{array}{c}\text{Average particle}\\\text{diameter of solid}\\\text{polymer 1}\end{array}}{\begin{array}{c}\text{Particle diameter}\\\text{of solid polymer 1}\\\text{at accumulated}\\\text{particle size of 4\%}\end{array}}$$

The index of occurrence of fine powder (FI) indicates the occurrence of fine powder during polymerization. The smaller than 1 FI is, the more is the occurrence of fine powder.

EXAMPLE 2

The procedure of Example 1 was followed to effect the production of a solid catalyst component and the polymerization in the presence thereof except that octamethylcyclotetarasiloxane was used instead of decamethylcyclopentasiloxane. The resulting solid catalyst component was then measured for Ti content. The result was 1.73% by weight. The properties of the catalyst thus obtained and the particle properties of a polymer produced in the presence thereof are set forth in Table 1.

EXAMPLE 3

The procedure of Example 1 was followed to effect the production of a solid catalyst component and the polymerization in the presence thereof except that dimethylpolysiloxane (viscosity: 100 cSt, TSF-451 available from Toshiba Silicone Co., Ltd.) was used instead of decamethylcyclopentasiloxane. The resulting solid catalyst component was then measured for Ti content. The result was 1.56% by weight. The properties of the catalyst thus obtained and the particle properties of a polymer produced in the presence thereof are set forth in Table 1.

EXAMPLE 4

The procedure of Example 1 was followed to effect the production of a solid catalyst component and the polymerization in the presence thereof except that dimethylpolysiloxane (viscosity: 10 cSt) was used instead of decamethylcyclopentasiloxane. The resulting solid catalyst component was then measured for Ti content. The result was 1.73% by weight. The properties of the catalyst thus obtained and the particle properties of a polymer produced in the presence thereof are set forth in Table 1.

COMPARATIVE EXAMPLE 1

The procedure of Example 1 was followed to effect the production of a solid catalyst component and the polymerization in the presence thereof except that decamethylcyclopentasiloxane was not used. The resulting solid catalyst component was then measured for Ti content. The result was 2.06% by weight. The properties of the catalyst thus obtained and the particle properties of a polymer produced in the presence thereof are set forth in Table 1.

TABLE 1

|  | Example | | | | Comparative Example |
|---|---|---|---|---|---|
|  | 1 | 2 | 3 | 4 | 1 |
| Properties evaluated | | | | | |
| Weight (a) of polymer produced (g) | 463 | 480 | 556 | 553 | 342 |
| Weight (b) of polymer insoluble in boiling n-heptane (g) | 460 | 478 | 552 | 549 | 339 |
| Polymerization activity (Y) (g/g-cat.) | 52,800 | 52,600 | 54,900 | 60,500 | 44,600 |
| Yield (t-II) of entire crystalline polymer (wt %) | 99.3 | 99.4 | 99.2 | 99.4 | 99.2 |
| Melt index (MI) (g/10 min.) | 4.3 | 3.5 | 3.3 | 4.7 | 4.2 |
| Bulk density (BD) (g/ml) | 0.45 | 0.44 | 0.45 | 0.44 | 0.41 |

TABLE 1-continued

|  | Example | | | | Comparative Example |
|---|---|---|---|---|---|
|  | 1 | 2 | 3 | 4 | 1 |
| Index of occurrence of fine powder (FI) | 1.14 | 1.20 | 1.00 | 0.95 | 0.78 |
| Melting point (° C.) |  |  | 164.9 | 164.3 | 162.9 |

EXAMPLE 5

<Preparation of Solid Catalyst Component>

A solid catalyst component was prepared in the same manner as in Example 1.

<Preparation of Polymerization Catalyst and Block Copolymerization of Propylene and Ethylene>

Into a 2 l autoclave equipped with an agitator in which the air within had been completely replaced by nitrogen gas were charged 1.51 mmol of triethylaluminum, 0.151 mmol of cyclohexylmethyldimethoxysilane and the foregoing solid catalyst component in an amount of 0.0030 mmol as calculated in terms of titanium atom to form a polymerization catalyst. Into the autoclave were then charged 6.5 l of hydrogen gas and 700 ml of liquid propylene. The mixture was then allowed to undergo prepolymerization reaction at a temperature of 20° C. for 5 minutes. The reaction system was heated to a temperature of 70° C. where it was then allowed to undergo polymerization reaction for 20 minutes (1st stage polymerization). After the termination of the 1st stage polymerization, unreacted propylene was purged from the autoclave. The air within the autoclave was then replaced by nitrogen gas. The reaction system was heated to a temperature of 65° C. where it was then subjected to polymerization for 1 hour while a 1:1 mixture of propylene and ethylene was being supplied thereto (2nd stage polymerization). The properties of the catalyst and the polymer thus obtained are set forth in Table 2. The polymerization activity was determined in accordance with the same method as in Example 1. The ethylene content of the copolymer obtained was determined by $^{13}$C-NMR. The content of ethylene propylene rubber (EPR) in the copolymer obtained was determined by the following method.

Into a 1 l flask equipped with an agitator and a condenser were added about 2.5 g of the copolymer, 8 mg of 2,6-di-t-butyl-p-cresol and 25 ml of p-xylene. The mixture was then stirred with boiling until the copolymer was completely dissolved. Subsequently, the flask was cooled to room temperature where it was then allowed to stand for 15 hours to cause a solid matter to be precipitated. The solid matter was then subjected to centrifugal separation by a centrifugal separator so that it was divided into a solid matter and a liquid phase. The solid matter thus separated was then withdrawn in a beaker. To the solid matter was then added 500 ml of acetone. The solid matter was stirred at room temperature for 15 hours, withdrawn by filtration, dried, and then measured for weight (this weight will be hereinafter referred to as "A"). The liquid phase portion thus separated was similarly processed to cause the precipitation of a solid matter which was then measured for weight (this weight will be hereinafter referred to as "B"). The content of ethylene propylene rubber (EPR) in the copolymer was calculated by the following equation:

$$EPR(wt\ \%)=\{B(g)/(A(g)+B(g))\}\times 100$$

The flowability of the copolymer thus obtained was evaluated by the following method.

Figure 2:
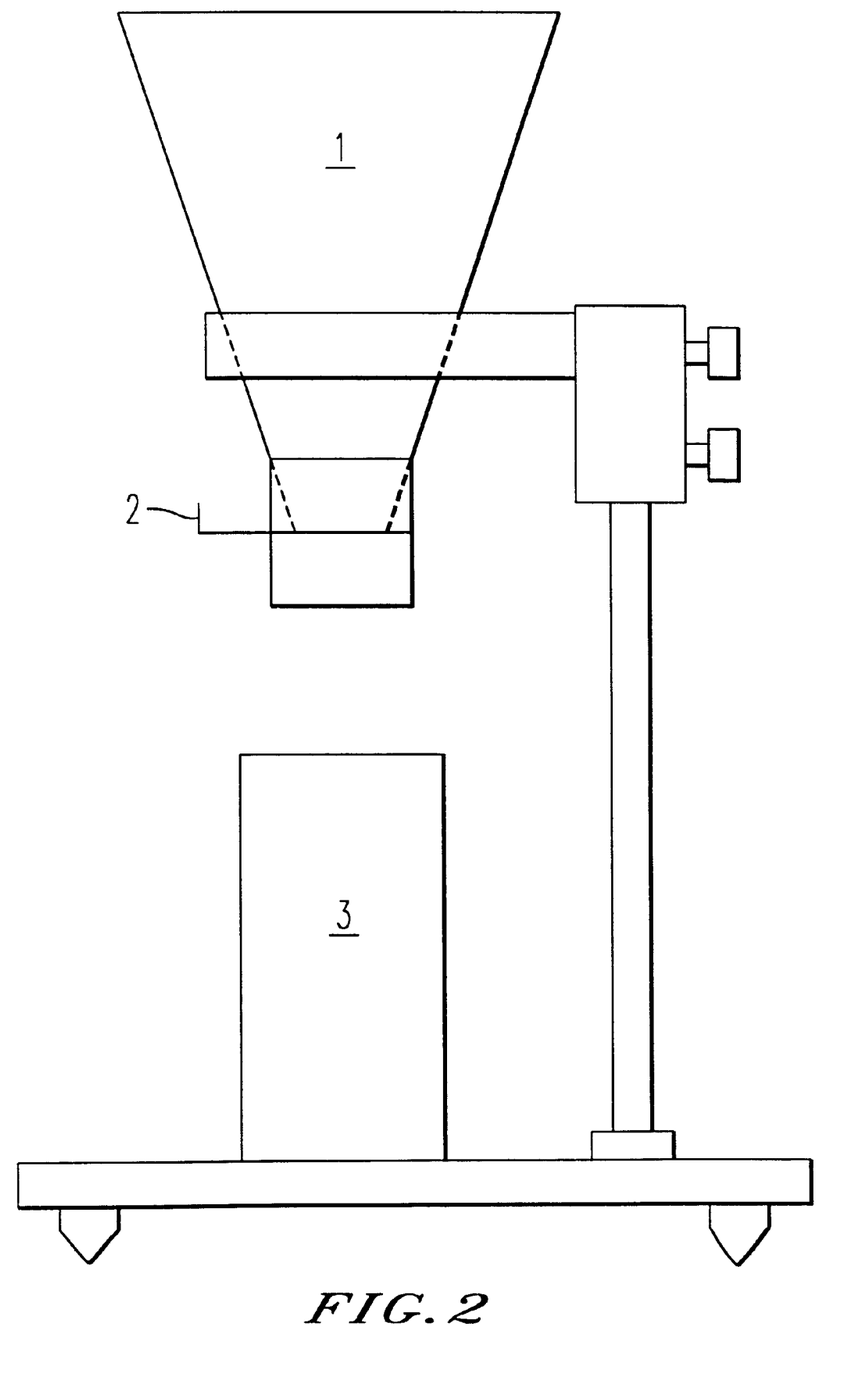
FIG. 2 is a schematic diagram illustrating an apparatus used for measuring the flowability of the copolymer in the examples.

An apparatus shown in FIG. 2 was used. 50 g of the polymer obtained above was charged into a funnel 1. Subsequently, a dumper 2 was removed so that the polymer dropped onto a receiver 3. The time required until the entire polymer dropped was measured. This operation was effected for the copolymer as well as for a propylene homopolymer (polymer obtained in Example 2) produced using the same solid catalyst component as used in the production of the copolymer. Assuming that the dropping time of the copolymer and the propylene homopolymer are T1 and T2, respectively, the flowability of the copolymer was represented by the following equation:

Flowability=$T1/T2$

EXAMPLE 6

The procedure of Example 5 was followed to effect the block copolymerization of propylene and ethylene except that the solid catalyst component prepared in Example 3 was used. The properties of the catalyst and the polymer thus obtained are set forth in Table 2.

COMPARATIVE EXAMPLE 2

The experiment procedure of Example 5 was followed except that the solid catalyst component prepared in Comparative Example 1 was used. The results are set forth in Table 2. The propylene homopolymer used for evaluation of flowability was obtained in Comparative Example 1.

TABLE 2

|  | Example 5 | Example 6 | Comparative Example 2 |
|---|---|---|---|
| Weight (a) of polymer produced (g) | 305 | 380 | 229 |
| Polymerization activity (g/g-cat.) | 38,200 | 41,300 | 32,900 |
| MI (g/10 min.) | 0.83 | 0.85 | 0.83 |
| Bulk density (g/ml) | 0.43 | 0.43 | 0.39 |
| Ethylene content (wt %) | 19.5 | 18.6 | 16.9 |
| EPR content (wt %) | 29.8 | 28.7 | 26.5 |
| Flowability (T1/T2) | 0.90 | 0.92 | 0.68 |

EXAMPLE 7

<Preparation of Solid Catalyst Component>

Into a 500-ml round flask equipped with an agitator in which the air within had been thoroughly replaced by nitrogen gas were charged 10 g of diethoxymagnesium and 80 ml of toluene to make a suspension. To the suspension was then added 20 ml of titanium tetrachloride of room temperature. The suspension was heated with stirring to a temperature of 50° C. where 5.2 ml of di-iso-octyl phthalate was then added thereto. The suspension was heated to a temperature of 70° C. where 1.0 ml of diethyl phthalate was then added thereto. To the suspension was then added 4.0 ml of dimethylpolysiloxane (viscosity: 100 cSt, TSF-451 available from Toshiba Silicone Co., Ltd). The reaction system was heated to a temperature of 112° C. where it was then reacted for 2 hours. After the termination of the reaction, the supernatant solution was removed. The resulting solid reaction product was processed with 80 ml of toluene and 20 ml of titanium tetrachloride at a temperature of 100° C. for 15 minutes, and then washed with 100 ml of toluene at a temperature of 100° C. three times. To the resulting solid reaction product were then added 80 ml of toluene and 20 ml of titanium tetrachloride. The mixture was processed with stirring at a temperature of 100° C. for 2 hours, and then washed with 100 ml of n-heptane of 40° C. 8 times to obtain a solid catalyst component. The solid catalyst component thus obtained was then measured for Ti content. The result was 2.2% by weight.

Preparation of Polymerization Catalyst and Polymerization

Into a 2 l autoclave equipped with an agitator in which the air within had been thoroughly dried with nitrogen gas and then replaced by propylene gas was charged 20 ml of n-heptane. Into the autoclave were then charged 1.31 mmol of triethylaluminum, 0.13 mmol of cyclohexylmethyldimethoxysilane and the foregoing solid catalyst component in an amount of 0.0026 mmol as calculated in terms of titanium atom while the reaction system was kept in an atmosphere of propylene to prepare a polymerization catalyst. Into the autoclave were then charged 3,000 ml of hydrogen gas and 1.4 l of liquid propylene. The mixture was then allowed to undergo prepolymerization reaction at a temperature of 20° C. with stirring for 5 minutes. The reaction system was immediately heated to a temperature of 70° C. where it was then allowed to undergo polymerization reaction for 1 hour to obtain a solid polymer. The properties of the catalyst and the polymer thus obtained are set forth in Table 3.

EXAMPLE 8

<Preparation of Solid Catalyst Component>

Into a 500-ml round flask equipped with an agitator in which the air within had been thoroughly replaced by nitrogen gas were charged 10 g of diethoxymagnesium, 80 ml of toluene and 2.5 ml of di-iso-decyl phthalate to make a suspension. To the suspension was then added 20 ml of titanium tetrachloride of room temperature. The suspension was heated with stirring to a temperature of 80° C. where 1.2 ml of di-iso-butyl phthalate was then added thereto. To the suspension was then added 4.0 ml of a dimethylpolysiloxane (viscosity: 100 cSt, TSF-451 available from Toshiba Silicone Co., Ltd.). The reaction system was heated to a temperature of 112° C. where it was then reacted for 2 hours. After the termination of the reaction, the supernatant solution was removed. The resulting solid reaction product was then processed with 80 ml of toluene, 20 ml of titanium tetrachloride and 0.25 ml of diethyl phthalate at a temperature of 110° C. for 30 minutes. The resulting supernatant solution was then removed. The resulting solid reaction product was then washed with 100 ml of toluene at a temperature of 100° C. three times. To the resulting solid reaction product were then added 80 ml of toluene and 20 ml of titanium tetrachloride. The mixture was processed with stirring at a temperature of 100° C. for 2 hours, and then washed with 100 ml of n-heptane of 40° C. 8 times to obtain a solid catalyst component. The solid catalyst component thus obtained was then measured for Ti content. The result was 2.1% by weight.

<Preparation of Polymerization Catalyst and Polymerization>

The polymerization procedure of Example 7 was followed except that the solid catalyst component thus obtained was used. The properties of the catalyst and the polymer thus obtained are set forth in Table 3.

EXAMPLE 9

<Preparation of Solid Catalyst Component>

Into a 500-ml round flask equipped with an agitator in which the air within had been thoroughly replaced by nitrogen gas were charged 10 g of diethoxymagnesium, 80 ml of toluene and 1.0 ml of di-iso-octyl phthalate to make a suspension. To the suspension was then added 20 ml of titanium tetrachloride of room temperature. The suspension was heated with stirring to a temperature of 50° C. where 4.2 ml of di-iso-octyl phthalate was then added thereto. To the suspension was then added 1.0 ml of a diethyl phthalate at a temperature of 70° C. To the suspension was then added 3.0 ml of a dimethylpolysiloxane (TSF-451 available from Toshiba Silicone Co., Ltd.) at a temperature of 100° C. The reaction system was heated to a temperature of 112° C. where it was then reacted for 2 hours. After the termination of the reaction, the supernatant solution was removed. The resulting solid reaction product was then processed with 80 ml of toluene and 20 ml of titanium tetrachloride at a temperature of 110° C. for 30 minutes. The resulting supernatant solution was then removed. The resulting solid reaction product was then washed with 100 ml of toluene at a temperature of 100° C. three times. To the resulting solid reaction product were then added 80 ml of toluene, 20 ml of titanium tetrachloride and 0.25 ml of diethyl phthalate. The mixture was processed with stirring at a temperature of 100° C. for 2 hours, and then washed with 100 ml of n-heptane of 40° C. 8 times to obtain a solid catalyst component. The solid catalyst component thus obtained was then measured for Ti content. The result was 2.3% by weight.

<Preparation of Polymerization Catalyst and Polymerization>

The polymerization procedure of Example 7 was followed except that the solid catalyst component thus obtained was used. The properties of the catalyst and the polymer thus obtained are set forth in Table 3.

EXAMPLE 10

<Preparation of Solid Catalyst Component>

Into a 500-ml round flask equipped with an agitator in which the air within had been thoroughly replaced by nitrogen gas were charged 10 g of diethoxymagnesium and 80 ml of toluene to make a suspension. To the suspension was then added 20 ml of titanium tetrachloride of room temperature. The suspension was heated with stirring to a temperature of 50° C. where 3.0 ml of butylbenzyl phthalate was then added thereto. The suspension was heated to a temperature of 70° C. where 1.0 ml of diethyl phthalate was then added thereto. To the suspension was then added 4.0 ml of a dimethylpolysiloxane (viscosity: 100 cSt, TSF-451 available from Toshiba Silicone Co., Ltd.). The reaction system was heated to a temperature of 112° C. where it was then reacted for 2 hours. After the termination of the reaction, the supernatant solution was removed. The resulting solid reaction product was processed with 80 ml of toluene and 20 ml of titanium tetrachloride at a temperature of 100° C. for 15 minutes, and then washed with 100 ml of toluene at a temperature of 100° C. three times. To the resulting solid reaction product were then added 80 ml of toluene and 20 ml of titanium tetrachloride. The mixture was processed with stirring at a temperature of 100° C. for 2 hours, and then washed with 100 ml of n-heptane of 40° C. 8 times to obtain a solid catalyst component. The solid catalyst component thus obtained was then measured for Ti content. The result was 2.0% by weight.

<Preparation of Polymerization Catalyst and Polymerization>

The polymerization procedure of Example 7 was followed except that the solid catalyst component thus obtained was used. The properties of the catalyst and the polymer thus obtained are set forth in Table 3.

EXAMPLE 11

<Preparation of Solid Catalyst Component>

Into a 500-ml round flask equipped with an agitator in which the air within had been thoroughly replaced by nitrogen gas were charged 10 g of diethoxymagnesium and 80 ml of toluene to make a suspension. To the suspension was then added 20 ml of titanium tetrachloride of room temperature. The suspension was heated with stirring to a temperature of 50° C. where 5.2 ml of di-iso-octyl phthalate was then added thereto. The suspension was heated to a temperature of 70° C. where 1.0 ml of di-n-propyl phthalate was then added thereto. To the suspension was then added 4.0 ml of a dimethylpolysiloxane (viscosity: 100 cSt, TSF-451 available from Toshiba Silicone Co., Ltd.). The reaction system was heated to a temperature of 112° C. where it was then reacted for 2 hours. After the termination of the reaction, the supernatant solution was removed. The resulting solid reaction product was processed with 80 ml of toluene and 20 ml of titanium tetrachloride at a temperature of 100° C. for 15 minutes, and then washed with 100 ml of toluene at a temperature of 100° C. twice. The resulting solid reaction product was then processed with 80 ml of toluene and 0.3 ml of di-n-propyl phthalate with stirring at a temperature of 105° C. for 30 minutes. Thereafter, to the resulting solid reaction product were added 80 ml of toluene, 20 ml of titanium tetrachloride and 4.0 ml of a dimethylpolysiloxane (TSF-451 available from Toshiba Silicone Co., Ltd.). The mixture was processed with stirring at a temperature of 100° C. for 2 hours, and then washed with 100 ml of n-heptane of 40° C. 8 times to obtain a solid catalyst component. The solid catalyst component thus obtained was then measured for Ti content. The result was 1.8% by weight.

<Preparation of Polymerization Catalyst and Polymerization>

The polymerization procedure of Example 7 was followed except that the solid catalyst component thus obtained was used. The properties of the catalyst and the polymer thus obtained are set forth in Table 3.

COMPARATIVE EXAMPLE 3

<Preparation of Solid Catalyst Component>

Into a 500-ml round flask equipped with an agitator in which the air within had been thoroughly replaced by nitrogen gas were charged 10 g of diethoxymagnesium and 80 ml of toluene to make a suspension. To the suspension was then added 20 ml of titanium tetrachloride of room temperature. The suspension was heated with stirring to a temperature of 90° C. where 3.5 ml of di-n-butyl phthalate was then added thereto. The reaction system was heated to a temperature of 112° C. where it was then reacted for 2 hours. After the termination of the reaction, the supernatant solution was removed. The resulting solid reaction product was then processed with 80 ml of toluene and 20 ml of titanium tetrachloride at a temperature of 100° C. for 15 minutes. The resulting solid reaction product was then washed with 100 ml of toluene at a temperature of 100° C. three times. To the resulting solid reaction product were then added 80 ml of toluene and 20 ml of titanium tetrachloride. The mixture was processed with stirring at a temperature of 100° C. for 2 hours, and then washed with 100 ml of n-heptane of 40° C. 8 times to obtain a solid catalyst component. The solid catalyst component thus obtained was then measured for Ti content. The result was 3.5% by weight.

Preparation of Polymerization Catalyst and Polymerization

The polymerization procedure of Example 7 was followed except that the solid catalyst component thus obtained was used. The properties of the catalyst and the polymer thus obtained are set forth in Table 3.

TABLE 3

|  | Example | | | | | Comparative Example |
|---|---|---|---|---|---|---|
|  | 7 | 8 | 9 | 10 | 11 | 3 |
| Properties evaluated | | | | | | |
| Polymerization activity (Y) (g/g-cat.) | 47,600 | 59,500 | 48,200 | 47,600 | 52,100 | 40,900 |
| Yield (t-II) of entire crystalline polymer (wt %) | 99.0 | 98.9 | 98.9 | 98.8 | 99.1 | 98.0 |
| Melt index (MI) (g/10 min.) | 7.9 | 8.5 | 9.3 | 11.0 | 10.0 | 11.0 |
| Xylene-soluble content (XS) (wt %) | 0.7 | 0.8 | 0.7 | 0.8 | 0.6 | 1.6 |
| Bulk density (BD) (g/ml) | 0.44 | 0.43 | 0.44 | 0.44 | 0.45 | 0.40 |
| Average particle size of polymer (micron) | 550 | 400 | 450 | 600 | 550 | 550 |
| Polymer having a particle diameter of 105μ or smaller (wt %) | 0.3 | 0.5 | 0.6 | 0.4 | 0.2 | 3.5 |

Industrial Applicability

The catalyst according to the present invention can exhibit a sufficiently high catalytic activity when used in the polymerization of olefins, in particular propylene. As a result, the content of catalyst residue in the polymer thus produced can be minimized, making it possible to reduce the content of chlorine remaining in the polymer thus produced to such an extent that no deashing process is required. Further, a stereoregular polypropylene-can be produced in an extremely high yield. The polypropylene thus produced has a high bulk density. Thus, an excellent polymer can be efficiently produced. Moreover, if polymerization is effected in the presence of the catalyst according to the present invention, the content of fine powder in the polymer thus produced can be reduced, making it possible to prevent any process troubles due to fine polymer powder.

Further, the catalyst of the present invention provides the copolymer thus produced with excellent particle properties, in particular excellent flowability, even if the production ratio of rubber-like copolymer in block copolymerization is raised. Thus, troubles in operation such as adhesion of particles can be eliminated.

We claim:

1. A catalyst component for polymerization of olefins, prepared by the reaction of components consisting of the following components (a) to (d):

(a) a dialkoxymagnesium or diaryloxy magnesium represented by the general formula:

$$Mg(OR^1)_2$$

wherein $R^1$ represents a $C_{1-4}$-alkyl or an aryl group;

(b) a titanium compound represented by the general formula:

$$Ti(OR^2)_pX_{4-p}$$

wherein $R^2$ represents a $C_{1-4}$-alkyl group; X represents a halogen atom; and p represents 0 or an integer of from 1 to 3;

(c) at least one $C_{1-12}$ straight-chain or branched alkyl or benzyl diester of phthalic acid; and (d) a cyclic or chain polysiloxane.

2. The catalyst component for polymerization of olefins as claimed in claim 1, wherein said diester of phthalic acid to be used as the component (c) comprises of at least two diesters of phthalic acid selected in such a manner that the difference in the sum of the number of carbon atoms of the two alkyl or benzyl groups between each of the respective diesters is at least 4.

3. A catalyst for polymerization of olefins, prepared from the following components (A), (B) and (C):

(A) a catalyst component as claimed in claim 1 or 2;

(B) an organic aluminum compound represented by the general formula:

$$R^3_qAlQ_{3-q}$$

wherein $R^3$ represents a $C_{1-4}$-alkyl group; Q represents a hydrogen, chlorine, bromine or iodine atom; and q represents a real number of from more than 0 to not more than 3; and (C) an organic silicon compound represented by the general formula:

$$R^4_rSi(OR^5)_{4-r}$$

wherein $R^4$ represents the same or different alkyl, cycloalkyl, phenyl, vinyl, allyl or aralkyl group; $R^5$ represents the same or different $C_{1-4}$-alkyl, cycloalkyl, phenyl, vinyl, allyl or aralkyl group; and r represents 0 or an integer of from 1 to 3.

4. The catalyst component for polymerization of olefins as claimed in claim 2, wherein the at least two diesters of phthalic acid are selected from the group consisting of the following combinations:

| Component (c1) | Component (c2) |
|---|---|
| 1) Di-n-butyl phthalate | Diethyl phthalate |
| 2) Di-iso-butyl phthalate | Diethyl phthalate |
| 3) Bis(2-ethylhexyl)phthalate | Diethyl phthalate |
| 4) Di-n-octyl phthalate | Diethyl phthalate |
| 5) Di-iso-decyl phthalate | Diethyl phthalate |
| 6) Butylbenzyl phthalate | Diethyl phthalate |
| 7) Di-n-hexyl phthalate | Diethyl phthalate |
| 8) Di-iso-hexyl phthalate | Diethyl phthalate |
| 9) Bis(2-ethylhexyl)phthalate | Di-n-propyl phthalate |
| 10) Di-n-octyl phthalate | Di-n-propyl phthalate |
| 11) Di-iso-decyl-phthalate | Di-n-propyl phthalate |
| 12) Butylbenzyl phthalate | Di-n-propyl phthalate |
| 13) Di-n-hexyl phthalate | Di-n-propyl phthalate |
| 14) Di-iso-hexyl phthalate | Di-n-propyl phthalate |
| 15) Bis(2-ethylhexyl)phthalate | Di-iso-butyl phthalate |
| 16) Di-n-octyl phthalate | Di-iso-butyl phthalate |
| 17) Di-iso-decyl phthalate | Di-iso-butyl phthalate |
| 18) Di-n-hexyl phthalate | Di-iso-butyl phthalate |
| 19) Di-iso-hexyl phthalate | Di-iso-butyl phthalate |
| 20) Bis(2-ethylhexyl)phthalate | Di-n-butyl phthalate |
| 21) Di-n-octyl phthalate | Di-n-butyl phthalate |
| 22) Di-iso-decyl phthalate | Di-n-butyl phthalate |
| 23) Di-n-hexyl phthalate | Di-n-butyl phthalate |
| 24) Di-iso-hexyl phthalate | Di-n-butyl phthalate |
| 25) Bis(2-ethylhexyl)phthalate | Diethyl phthalate and di-n-butyl phthalate |
| 26) Bis(2-ethylhexyl)phthalate | Diethyl phthalate and di-iso-butyl phthalate. |

* * * * *

UNITED STATES PATENT AND TRADEMARK OFFICE
CERTIFICATE OF CORRECTION

PATENT NO. : 5,932,510

DATED : August 3, 1999

INVENTOR(S): Motoki HOSAKA, et al.

It is certified that an error appears in the above-identified patent and that said Letters Patent is hereby corrected as shown below:

On the title page, item [30] should be:

--[30]  Foreign Application Priority Data
    Sep.  1, 1995 [JP] Japan ............... 7-248398
    Sep. 18, 1995 [JP] Japan ............... 7-263507--

On the title page, item [75], the spelling of the inventors' city should be:

--Kanagawa--

Signed and Sealed this

Thirteenth Day of February, 2001

Attest:

NICHOLAS P. GODICI

Attesting Officer    Acting Director of the United States Patent and Trademark Office